C. W. POST.
APPARATUS FOR THE TREATMENT OF ARTICLES WITH HEAT.
APPLICATION FILED MAY 22, 1919.
1,379,595. Patented May 24, 1921.
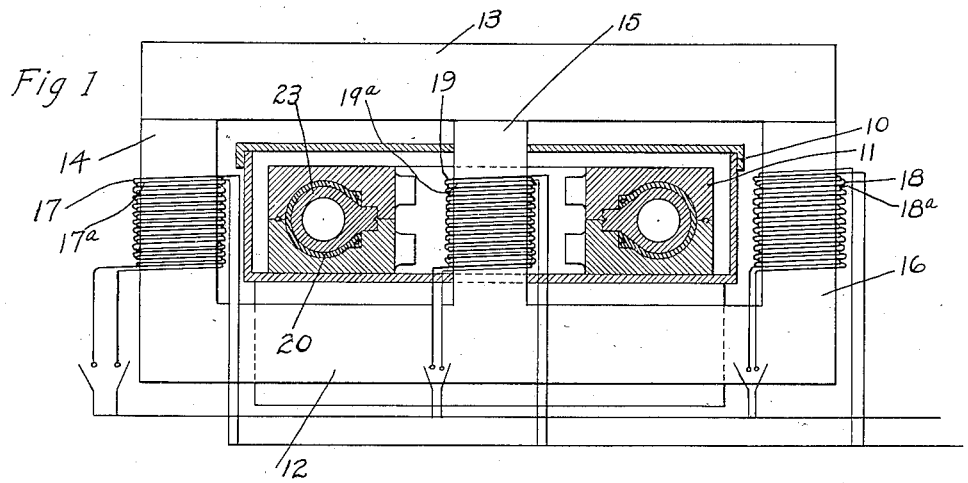
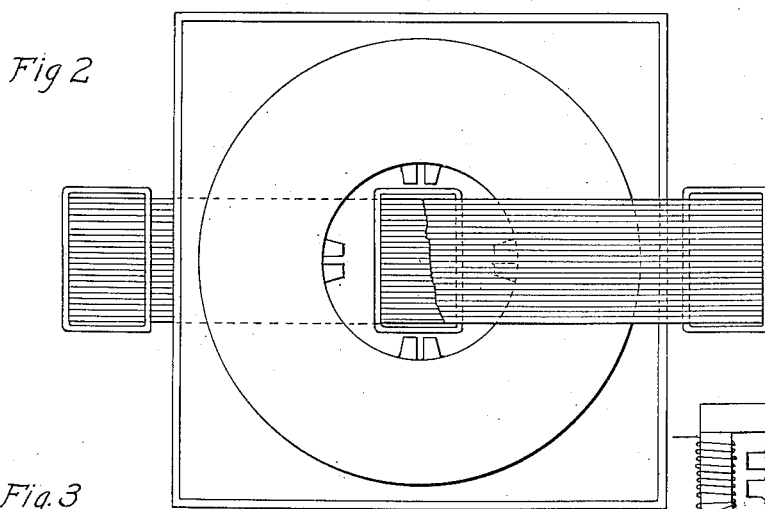
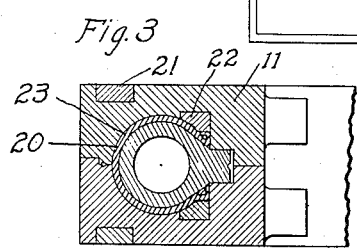
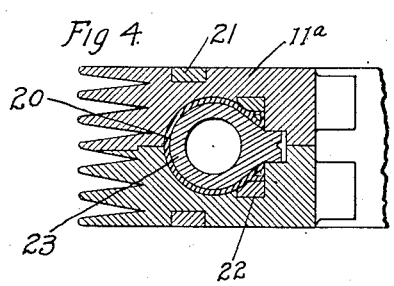
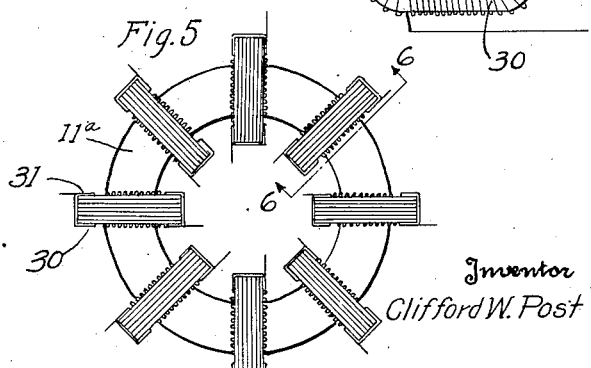
Inventor
Clifford W. Post
By
Attorney

UNITED STATES PATENT OFFICE.

CLIFFORD W. POST, OF AKRON, OHIO, ASSIGNOR TO THE GOODYEAR TIRE & RUBBER COMPANY, OF AKRON, OHIO, A CORPORATION OF OHIO.

APPARATUS FOR THE TREATMENT OF ARTICLES WITH HEAT.

1,379,595.     Specification of Letters Patent.     Patented May 24, 1921.

Application filed May 22, 1919. Serial No. 298,964.

*To all whom it may concern:*

Be it known that I, CLIFFORD W. POST, a citizen of the United States, and resident of Akron, Ohio, have invented new and useful Improvements in Apparatus for the Treatment of Articles with Heat, of which the following is a specification.

My present invention relates to new and useful improvements in the method and apparatus for the treatment of articles with heat. I have found that it is particularly well adapted for the treatment of rubber articles, in the course of their manufacture, in the so-called "curing" or vulcanization of the raw rubber of which they are wholly or in part composed.

It has long been recognized that the use of steam as a heating medium for this purpose is open to the objections of high cost and difficulty in properly controlling the temperature during the vulcanizing or curing process, as well as to other objections.

Being cognizant of these conditions, the principal object of my invention has been to provide a method and apparatus for treating rubber articles and the like with heat during the vulcanization thereof, which shall not only be economical in operation, but one wherein the proper degree of heat shall be obtained and accurately maintained to any desired curing temperature, and throughout any or all the portions of the article.

The following description considered in connection with the accompanying drawings, wherein I have illustrated an apparatus which may be used for practising my new method, will afford an understanding of my invention, but it is, of course, to be understood that the scope and extent of the invention are defined in the claims hereto appended and forming a part of this application, and are not to be regarded as limited by the specific embodiment of apparatus disclosed, or otherwise, except by the claims.

In the drawings:

Figure 1 is a vertical section of an apparatus used for practising my invention, the electric connections and windings being conventionally shown;

Fig. 2 is a plan view, with the top piece broken away;

Fig. 3 is a detail section showing a modification of the mold;

Fig. 4 is a detail section showing a further modification of the mold;

Fig. 5 is a plan view of a modified form of apparatus; and

Fig. 6 is a vertical section on the line 6—6 of Fig. 5.

In order that my method of curing or vulcanizing rubber articles may be most readily understood, the construction and operation of the illustrated type of apparatus used for practising it will first be described.

The numeral 10 designates a box, or equivalent container or casing, which may be made of compressed asbestos, fiber-board, fire brick, heat insulating material, or in fact of any suitable material. This box or container, which is in the nature of an inclosing oven for the article and its mold, may be of any desired size or shape. It should, however, be made of such material and be of such size and shape that heat may not be inefficiently dissipated.

In this connection, it will be understood that while it is desirable for the sake of efficient operation, that a container or inclosure of some sort be used, the method may, nevertheless, be practised without the use of an inclosing wall, although if this were done the cost of curing would naturally be increased owing to heat losses.

Within the oven 10 is placed a mold 11, which, as shown, is of the character usually employed for curing pneumatic tires 20; although it will be understood that any of the numerous other types of molds employed for curing articles of different character may be used without requiring any change in my present method or in the apparatus used for practising it.

The mold 11 may be made of any suitable metal which will conduct an electrical current, and while it may be made of a substantially non-magnetic material, it is, for practical reasons, usually made of magnetic material, such as cast iron or steel. When it is thus made of magnetic material, there is induced therein, as described below, not only a secondary electrical current, but a magnetic flux as well, which magnetic flux superinduces in the material a heating effect due to eddy currents, and hysteresis effects in addition to that caused by the above mentioned secondary current, and the total heating effect will therefore depend on the permeability of the material and on its conductivity.

The heating of the mold 11 is brought about, primarily, by inducing in the mold a secondary electric current, and also a magnetic flux, when the mold is of magnetic material as explained above.

For the purpose of inducing such a current I may use a transformer type of induction apparatus such, for example, as an H shaped electro-magnet core body shown in the drawings and comprising the parts 12, 13, 14, 15 and 16. Each of these latter members is preferably formed as in the ordinary transformer, of laminations of iron or other suitable material. Primary coils 17 and 18 are wound about the members 14 and 16. A primary coil 19 may also be wound about the member 15, and, as will be understood, a primary current may be passed through any one or two, or through all three of the coils. The primaries may consist each of two windings as shown, 17 and 17ª, 18 and 18ª, and 19 and 19ª, with switches for each, so that the current may be passed through one or both windings, as desired.

Suitable connections are, of course, provided as indicated to permit the passing of a current through the primary coil or coils when the apparatus is to be used for heating the mold in which the tire or other article is contained.

The upper horizontal member 13 of the H shaped core body, in the form of apparatus shown, is removable in order to permit access to the interior of the core body whereby the mold 11 may be introduced and removed from the apparatus at will. Any suitable means, not shown, may be provided for clamping the member 13 tight upon the supporting members 14, 15 and 16, to secure good contacts.

From the foregoing description, an understanding may be had of the manner in which the apparatus may be used in carrying out my method of curing or vulcanizing rubber articles contained within the mold 11, which method is as follows:

An alternating electric current, of suitable frequency, is passed through the primary coils 17 and 18 with the result that a secondary current is induced within the body of the mold 11. This induced current in the mold 11 will heat this member to a degree of temperature which will depend on certain variable factors, as will presently be described, and can be controlled as desired.

The degree of heat may be determined, controlled and localized by the variation of one or more of these factors.

First, as will be understood, the heating effect depends directly on the intensity of the secondary currents. It follows, therefore, that the number of turns in the windings of the primary circuit and the primary voltage applied determines the strength of the induced current. Consequently the heating effect may be controlled by regulating the primary voltage and the number of windings in the primary coil or coils. As a further variation of this method of temperature control, the primary coils may be made up of a plurality of separate windings, as shown, so that the current may be shunted through one or more of the primary windings as desired, thus controlling the current passing through the secondary formed by the mold, and consequently the heat developed therein.

Secondly, the heat in the mold may be determined by making the mold of such configuration that it will radiate more or less heat, as desired, with the result that the amount of retained heat may be properly distributed. In this connection, it may be noted that the amount of metal in the mold is also a controlling factor, a smaller mass of metal being heated to a higher temperature, other conditions being the same, than a larger mass could be. However, the total amount of heat will, of course, be less with a smaller mass of material.

In Fig. 4 I have shown a mold 11ª having a relatively large radiating surface.

The third way in which the heat in the mold may be controlled both as to the amount of heat generated therein and its localization, is by the insertion into the mold of rings or segments of different metals or compositions thereof, which rings may have, as desired, a greater or less resistance than the metal of which the mold is made. The use of these rings may be best explained by an example, and reference to Figs. 3 and 4. If it were found that there was a tendency for the mold to develop too much heat at the surface of the tire 20, (if that were the article being cured), then by introducing a ring of metal 21 of greater conductivity around the periphery of the mold, the current would tend to flow through this ring rather than through the body of the mold, and with the same total amperage, the heating effect around the inner circumference of the mold would accordingly be reduced. In an analogous way a local heating effect could be produced by inserting in the mold a ring or segment of metal of higher conductivity in proximity to the bead of the tire as at 22, to give a greater heating effect about the bead.

It is customary in practising my method to associate with the rubber article or articles to be cured or vulcanized, a mold of a metal which will serve as the conductor of the secondary current. In addition to the use of the mold, a metallic core 23 is also commonly associated with the article, which, like the mold, will constitute a secondary or induced circuit. In cases, however, where neither a mold nor core of a conducting metal is used, an extraneous secondary current carrier may be associated with the rubber article.

The core described above, or the extraneous secondary conductor, may like the mold, be made of a comparatively non-magnetic material; it is, however, in practice usually made of magnetic material. The core may be made of a metal, which under excessive temperature will have greatly increased resistance or reluctance, and will thereby tend to retard further increase in temperature and to maintain a constant temperature in the mold. An alloy such as chrome nickel steel may be mentioned as an example of such a metal, as that just referred to.

In curing some types of tires, it is customary to use an air bag in the tire, for the purpose of inflating the tire during vulcanization thereof.

With such an air bag a wire mesh may be associated, either as a casing for the air bag or incorporated with it, and the wire mesh will then, in either case, act as a secondary conductor.

In Figs. 5 and 6 I have illustrated a modified form of apparatus for practising my method. In this modification a plurality of horse-shoe core bodies or electro-magnets 30 is arranged radially about the mold 11ª. The primary coils 31 are wound about the legs of each horse-shoe magnet. A series of switches 32 may be provided so that the primary current may be shunted through as few or as many of the coils as it may be desired to utilize, with the result that certain selected portions of the mold containing the rubber article or articles may be heated.

In this modified form of apparatus shown in Figs. 5 and 6, if the mold be of magnetic material, as would be the case when cast iron or steel is used, eddy currents are set up in the mass of the mold, and these as well as the hysteresis effects are utilized in heating the mold.

While I have shown in Fig. 1 a single compartment or container 10 adapted for the reception of one core body, it is within the scope of my invention to provide a long container or casing corresponding to the box 10, in which a plurality of molds may be placed at one time. This may be further modified by providing a long container wherein a suitable conveyor system may be provided, to cause a plurality of molds containing the articles to be cured, to travel slowly from one end of the container or oven to the other while they are being heated, the molds containing the uncured articles being introduced at one end, and the molds containing the cured articles being removed at the other. In such a modified form of apparatus, the transformer core may be omitted and the induced heating currents obtained by passing the molds through a stationary primary winding.

It will now be apparent from the foregoing, that the method involved in my present invention consists essentially in using a mold, in which a rubber article is contained for curing, or the core upon which the article is built up, as the secondary circuit and in providing a primary circuit as, for instance, of the transformer type shown, to cause the induction in this mold or core of a secondary current or of a magnetic flux, this secondary current heating the mold or core, and hence the rubber article associated therewith to the proper temperature.

In referring herein to rubber articles, I mean to include not only those composed entirely of rubber, such as solid rubber tires and the like, but also articles which are composed only in part of rubber, such as pneumatic tires. Hence, the term "rubber article" as used herein designates any article which has a rubber component that must be vulcanized during the process of its manufacture.

In conclusion, I desire to explain that the transformer type of apparatus shown in the accompanying drawings is only one of a number of possible forms of electro-magnetic apparatus which may be used for practising my method. As will be apparent, any apparatus which may be used to induce a secondary current or magnetic fluxes in the core, mold, wire mesh, or extraneous metallic element associated with the rubber article being subjected to the vulcanizing process, may be utilized for carrying out my invention.

What I claim is:

1. In an apparatus of the kind described, a mold of electric conducting material adapted to have a rubber article associated therewith, said mold having a groove, a ring in said groove of material of different resistance from that of said mold, said ring being replaceable by rings of different material, and means for inducing an electric current in said mold and ring to heat the same, the degree of heat being controlled by the relative resistance of said ring.

2. In an apparatus of the kind described, a mold of electric conducting material adapted to have a rubber article associated therewith, said mold having a groove, a ring in said groove of material of different resistance from that of said mold, and means for inducing an electric current in said mold and ring to heat the same, the degree of heat being controlled by the relative resistance of said ring.

3. In an apparatus of the kind described, a mold made up of metals of different conductivity and adapted to have a rubber article associated therewith, means for inducing an electric current in said mold to heat the same, the degree of heat being determined by the conductivity of the metals in the mold.

4. In an apparatus of the kind described, a mold of electric conducting material adapted to have a rubber article associated therewith, said mold being of a selected exterior configuration whereby its heat radiating surface controls the temperature of the mold and article associated therewith, and means for inducing an electric current in said material to heat the same.

5. In an apparatus of the kind described, a mold of electric conducting material adapted to have a rubber article associated therewith said mold having a groove, a ring in said groove of material of a different conductivity from that of said mold, said ring being replaceable by rings of different materials, means for inducing electric current in said mold and ring to heat the same, the degree of heat being controlled by the relative resistance of said ring, and means for controlling said induced current.

6. In an apparatus of the kind described, a mold of electric conducting material adapted to have a rubber article associated therewith, said mold being of a selected exterior configuration whereby its heat radiating surface controls the temperature of the mold and article associated therewith, means for inducing an electric current in said material to heat the same, and means for controlling said induced current.

7. In an apparatus of the kind described, an annular mold or molds adapted for association with a rubber article to be cured, a plurality of horse-shoe magnets radially arranged about said mold or molds, primary windings about said horse-shoe magnets, for carrying an electric current, whereby a secondary current is induced in said mold to heat the same.

8. The combination with a forming core adapted to be inserted within a tire to be vulcanized, and an annular mold of electrical conducting material adapted to inclose the forming core and tire, of a plurality of transformer coils, and a plurality of transformer cores adapted to be energized by said coils, each of said cores having a separable section adapted to permit each of the cores to be threaded through the mold, the mold being adapted to constitute the secondary winding of a transformer.

9. The combination with a forming core adapted to be inserted within a tire to be vulcanized, and an annular mold of electrical conducting material adapted to inclose the forming core and tire, of means for establishing a plurality of magnetic circuits threading the mold, the magnetic circuits being arranged circumferentially around the mold.

In witness whereof, I have hereunto signed my name in the presence of two subscribing witnesses.

CLIFFORD W. POST.

Witnesses:
L. M. HARTMAN,
E. C. LEADENHAM.